March 24, 1959  J. J. PARKER ET AL  2,878,707
WORK-HOLDER FOR SPLINED ARTICLES WITH HERRINGBONE CAMS
Filed May 16, 1957
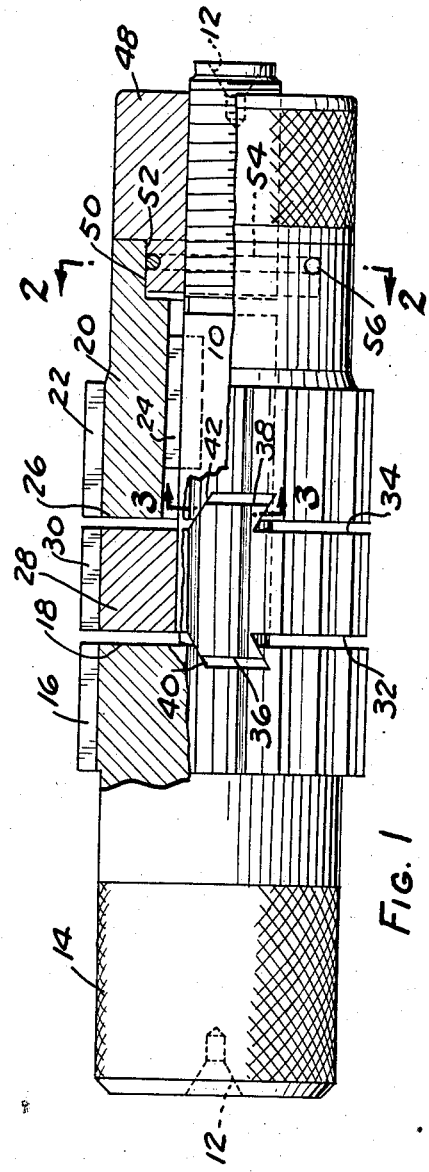
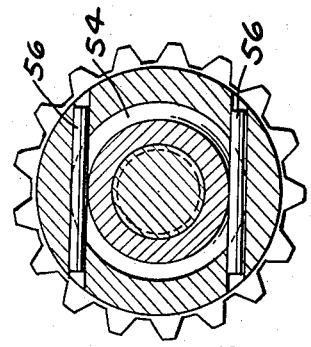
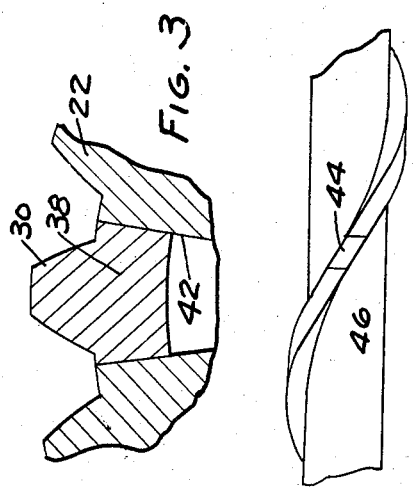 
INVENTORS
JOHN J. PARKER & LONDON T. MORAWSKI
BY
*Barnes, Kisselle, Laughlin & Raisch*
ATTORNEYS.

2,878,707

WORK-HOLDER FOR SPLINED ARTICLES WITH HERRINGBONE CAMS

John J. Parker and London T. Morawski, Detroit, Mich.

Application May 16, 1957, Serial No. 659,548

4 Claims. (Cl. 82—43)

This invention relates to work holding devices particularly for work pieces having splines or gear teeth thereon, by engagement with which a work piece is held for performing machining or gaging operations thereon.

It is an object of the present invention to provide a construction for holding a work piece having teeth thereon in which a pair of axially spaced work-engaging members having aligned teeth may be moved axially to cause rocking movement of a third work-engaging member having matching teeth in a manner to clamp a toothed work piece with a high degree of accuracy as to centering and axial alignment between the teeth of the work piece and the teeth of the work-holding devices.

In devices of this character, the rocking movement may be produced by means of helical or other inclined camming surfaces which act to convert the axial movement of the outer members into a rocking movement of the third or inner toothed member. Because of the inclined cams, the construction of chucks, arbors and work-holders of this class has heretofore involved a number of separate pieces and have lacked the durability and long life which is desired for long production runs as well as the rigidity and ruggedness required for maintaining accuracy.

It is an object of the present invention to provide a work-holder of the class described which may be produced from a few strong and rigid pieces with a high degree of accuracy.

Further objects and advantages of the present invention will be apparent from the following description, reference being had to the accompanying drawing wherein a preferred form of the present invention is illustrated.

In the drawing:

Fig. 1 is a side view partly broken away, showing one form of the present invention.

Fig. 2 is a cross section on line 2—2 of Fig. 1.

Fig. 3 is an enlarged fragmentary section on line 3—3 of Fig. 1.

Fig. 4 is a diagram of an imaginary helix.

In the drawing, there is illustrated a work-holding arbor comprising a central shaft 10 having centers 12 at its opposite ends. At its left end, the shaft 10 is enlarged to provide a knurled handle 14 and is also provided with an integral set of spline-engaging teeth 16, which may form a first work-engaging member. To the right of the teeth 16, the shaft 10 is reduced in diameter and presents a flat face 18 facing toward the right in Fig. 1. Slideably keyed on the shaft 10 is a second work-engaging member 20 having a second set of spline-engaging teeth 22. Teeth 22 are machined so as to be in axial alignment with the teeth 16 and the member 20 is maintained in an angularly fixed position with respect to shaft 10 by a key 24. The left end of the member 20 presents a face 26 to the right and also generally flat.

Intermediate the faces 18 and 26, there is mounted for rotation upon shaft 10 a third work-engaging member 28 having spline-engaging teeth 30 which match the teeth 16 and 22 but may be rocked into and out of alignment therewith. The member 28 presents generally flat faces 32 and 34 juxtaposed to the faces 18 and 26 respectively.

Formed upon the faces 32 and 34 are a pair of tongues 36 and 38 which engage in correspondingly shaped grooves 40 and 42, formed in the faces 18 and 26. The tongues and grooves are of opposite hand so as to present a herringbone appearance in Fig. 1. The side contours of the tongues and grooves are preferably formed from a helical thread of long pitch, such for example as the thread shown diagrammatically in Fig. 4. In this view, the small element 44 of the thread 46 corresponds to the portion utilized for the tongues and grooves.

The right hand end of the shaft 10 is threaded to receive a knurled nut 48 having a reduced portion 50 which is received within a bore 52 on the right hand end of member 20. A groove 54 is formed on the portion 50 so as to receive a pair of pins 56 (see Fig. 2) for the purpose of locking the nut 48 against endwise movement with respect to member 20 while at the same time permitting relative rotation thereof.

In operation, the nut 48 may be backed off to a suitable position such as that illustrated in Fig. 1 in which there is some space available between the opposing faces 18—32 and 26—34. A work piece may then be slid over the teeth 16, 30 and 22 to the desired position on the arbor. Nut 48 is then screwed to the left, forcing the face 26 toward the face 18. The action of the tongues 36—38 in the grooves 40—42 is such that this causes a camming action and rocks the member 28 about the axis of shaft 10. This produces misalignment between the teeth 30 on the one hand and the teeth 16 and 22 on the other hand. Thus, opposing torques are created upon the side faces of the teeth of the work piece to clamp the same tightly upon the arbor.

It will thus be seen that the present invention provides a work piece holder which may be used to clamp a splined or toothed work piece by opposing torques exerted upon the side faces of the teeth, in which the construction is simple and rugged and which avoids the use of a number of loose or separate pieces. Thus, the tongues are formed integrally with the intermediate member although it will be understood they could as well be reversed and formed upon the two outer members respectively.

While the form of embodiment of the invention as herein disclosed constitutes a preferred form, it is to be understood that other forms might be adopted, all coming within the scope of the claims which follow.

What is claimed is as follows:

1. A construction for holding a splined work piece comprising a pair of axially spaced work engaging members having a set of aligned teeth thereon arranged to engage the spline of the work piece and having opposed, generally flat end faces, means for drawing said end pieces toward each other while maintaining the teeth aligned, a third work engaging member rockably mounted between said end faces and having teeth rockable into and out of alignment with the first set of teeth and having its end faces juxtaposed to the first mentioned end faces, one pair of said juxtaposed end faces having a set of interengaged tongue and groove cams thereon formed integrally with their respective members, said tongue cam comprising an axial projection on one of said end faces having parallel side faces forming a portion of a helical screw thread of relatively large pitch, said groove cam comprising an axially extending socket in the other of said last mentioned pair of end faces having parallel side faces forming a portion of said helical screw thread, the side faces of said tongue cam having a close fit with the side faces of said groove cam and extending radially on said end faces to the outer peripheries of their respective members.

2. The combination called for in claim 1 wherein each of said two pair of juxtaposed end faces are provided with a set of interengaging tongue and groove cams.

3. The combination called for in claim 2 wherein said two sets of tongue and groove cams are of opposite hand.

4. A construction for holding an internally splined work piece comprising a shaft having a pair of axially spaced work engaging members mounted thereon, one of said members being rotatably and axially fixed on said shaft and the other being axially slidable and rotatably fixed on said shaft, said work engaging members having a set of aligned teeth on the periphery thereof arranged to engage the spline of the work piece, a third work engaging member mounted on said shaft between the other two work engaging members for rotation and axial movement and having axially extending teeth around the outer periphery thereof, the opposite end faces of the third work engaging member being juxtaposed to the adjacent end faces of the first and second work engaging members, said two sets of juxtaposed end faces each having a pair of interengaged tongue and groove cams thereon, said tongue cams each comprising an axial projection on one of said end faces having parallel side faces forming a portion of a helical screw thread of relatively large pitch, said groove cams each comprising an axially extending socket in one of said end faces having parallel side faces forming a portion of said helical screw thread, the side faces of said tongue cam having a close fit with the side faces of said groove cam and extending radially on said end faces to the outer peripheries of their respective members, said shaft projecting axially beyond the other end face of said second work engaging member, said projecting end portion of the shaft being threaded and a nut threaded on said projecting end portion of the shaft and engaging the adjacent end face of said second work engaging member, said second work engaging member being fixed axially to said nut, said nut being rotatable relative to said second work engaging member.

References Cited in the file of this patent
UNITED STATES PATENTS

| | | |
|---|---|---|
| 2,665,136 | Fallon | Jan. 5, 1954 |
| 2,762,629 | Dalby | Sept. 11, 1956 |